Patented Feb. 21, 1950

2,498,302

UNITED STATES PATENT OFFICE 2,498,302

PREVENTION AND DESTRUCTION OF WEEDS

Wilfred Archibald Sexton, Manchester, and Roland Edgar Slade and William Gladstone Templeman, Bracknell, England, assignors to Imperial Chemical Industries Limited, a corporation of Great Britain No Drawing. Application August 27, 1945, Serial No. 613,021. In Great Britain May 5, 1941

Section 1, Public Law 690, August 8, 1946
Patent expires May 5, 1961

5 Claims. (Cl. 167—45)

This invention relates to the prevention and destruction of weeds.

We have found that carboxylic acids of the general formula which follows and their water-soluble salts are effective against weeds.

The general formula is R.CO.X.COOH, in which R stands for phenyl or naphthyl, X stands for either the group —$CH_2.CH_2$— or the group —CH:CH— or a phenylene radical to which the R.CO— and —COOH groups are attached in ortho-positions and in which the phenyl, naphthyl or phenylene radicals may carry methyl or halogen substituents.

The substances are generally effective in quantities of a few pounds per acre, and so in order to be able to distribute them effectively, they are incorporated in larger quantities of fertilisers, and/or solid soil-conditioning agents and/or solid inert diluents, the resulting preparations being preferably in dry pulverulent form.

Although exerting a phytocidal action on weeds, the preparations can be applied to ground containing germinating or growing weeds and cereal or other useful crops so as to kill or stunt the weeds effectively without harming the useful crops. The preparations are, however, in general most conveniently applied to the soil before, during or immediately after germination of the weed.

The substances can be used very effectively for the control of charlock in oat crops. When applied to the soil before germination, the growth of charlock can be prevented without harming the oats.

It is already known to spray dilute sulphuric acid on charlock. Sulphuric acid, however, is not only highly corrosive, but it neutralises and renders inactive a corresponding amount of lime or other alkali in the soil.

When applying the substances with fertilisers or soil-conditioning agents or diluents, the substances are conveniently mixed in such proportions that the soil receives the correct dressing both of weed killing substance and fertiliser, soil-conditioning agent and/or diluent. Inorganic and organic fertilisers and manures may be used, for example ammonium sulphate, basic slag, potash salts, and superphosphates, peat, and hop manures. Hydrated lime, ground lime, and chalk are convenient soil-conditioning agents. Sand, talc, and clay in powder form may be used as solid inert diluents. By an inert diluent we mean a substance which is neither a fertiliser nor a soil-conditioning agent, but which is without harmful effect on crops.

Accordingly this invention contemplates the use, for the prevention and destruction of weeds, of a compound selected from the group consisting of carboxylic acids, and water-soluble salts thereof, which acids conform to the general formula R.CO.X.COOH, R being a radical selected from the group consisting of the phenyl radical, the naphthyl radical, and such radicals having at least one substituent of the class composed of the methyl radicals and halogen radicals, and X is a radical selected from the group consisting of the ethylene radical, the vinylene radical, the ortho-phenylene radical, and orthophenylene radicals having at least one substituent of the class composed of the methyl radicals and halogen atoms. The invention also includes the use of such a compound for killing weeds associated with cereal crops. The invention further includes compositions comprising such a compound in association with a solid carrier which may be a fertiliser, a soil-conditioning agent, or an inert diluent.

Thus the invention includes the use of compounds conforming to the above formula in which R, in addition to being phenyl or naphthyl is o-, m-, or p-chlorophenyl, o-, m-, or p-methylphenyl, a dichlorophenyl, a dimethylphenyl, or a methyl-chlorophenyl; R may also be a chloronaphthyl, a methylnaphthyl or a chloromethylnaphthyl. X may be, in addition to an ethylene, vinylene or orthophenylene radical, a chloro-ortho-phenylene radical, a methyl-ortho-phenylene radical or a methyl-chloro-ortho-phenylene radical. Water-soluble salts of the acid which may be used include the ammonium salts and the alkali metal salts, in particular the sodium and potassium salts. Advantageously we use benzoyl-o-benzoic acid, 4'-chloro-2-benzoyl benzoic acid, 4'-methyl-2-benzoylbenzoic acid or sodium or potassium salts of such acids.

The following examples illustrate but do not limit the invention, all parts being by weight.

*Example 1*

1000 parts of chalk were intimately mixed with 200 parts of the sodium salt of benzoyl-o-benzoic acid. The resulting mixture when applied to soil containing young oats and weeds at the rate of 1 cwt. per acre prevented establishment of the weeds without harming the cereal crop.

*Example 2*

20 parts of 4'-chloro-2-benzoylbenzoic acid were well mixed with 100 parts of ammonium sulphate.

The resulting mixture when applied to the soil after the sowing of oats, and prior to their germination, at the rate of 120 lbs. per acre had a strong deterrent action on the growth of weeds, while encouraging the growth of the oats.

Example 3

4'-methyl-2-benzoylbenzoic acid was incorporated into hop manure in the proportions of 1 part of the former to 45 parts of the latter. The resulting composition formed a useful combined fertiliser and weed prevention preparation.

The active compounds used in the foregoing examples may be replaced by other compounds coming within the defined classes, as for example 3-amino-4'-chloro-benzoylbenzoic acid and beta-(1-naphthoyl)propionic acid and their soluble salts.

We claim:

1. A composition suitable for the destruction and prevention of weeds containing a fertilizer and an alkali metal salt of benzoyl-o-benzoic acid in amount sufficient to exert herbicidal action.

2. A composition suitable for the destruction and prevention of weeds containing (1) an active herbicidal compound, in amount sufficient to exert herbicidal action, from the group consisting of (a) benzoyl-o-benzoic acid, (b) 4'-chloro-2-benzoyl benzoic acid, (c) 4'-methyl-2-benzoyl benzoic acid, and (d) the water-soluble salts of said acids and (2) a non-phytocidal, dry, pulverulent solid which does not decrease the fertility of soil.

3. A composition according to claim 2 in which the dry pulverulent solid is an inert diluent.

4. A composition suitable for the destruction and prevention of weeds containing (1) a fertilizer and (2) an active herbicidal compound, in amount sufficient to exert herbicidal action, from the group consisting of (a) benzoyl-o-benzoic acid, (b) 4'-chloro-2-benzoyl benzoic acid, (c) 4'-methyl-2-benzoyl benzoic acid, and (d) the water-soluble salts of said acids.

5. A composition according to claim 2 in which the dry pulverulent solid is a soil conditioning agent.

WILFRED ARCHIBALD SEXTON.
ROLAND EDGAR SLADE.
WILLIAM GLADSTONE TEMPLEMAN.

REFERENCES CITED

The following references are of record in the file of this patent:

UNITED STATES PATENTS

| Number | Name | Date |
|---|---|---|
| 2,322,760 | Lontz | June 29, 1943 |
| 2,390,941 | Jones | Dec. 11, 1945 |
| 2,396,513 | Jones | Mar. 12, 1946 |

OTHER REFERENCES

Richter's Organic Chemistry, D'Albe, 11th ed., vol. II, page 575. (P. Blackiston's Son and Co., Philadelphia, Pa., 1922.)

Article by Zimmerman et al., Contributions Boyce Thompson Inst., April–June 1939, pages 363 to 376 (particularly page 365).